(12) United States Patent
Lottero et al.

(10) Patent No.: US 7,640,533 B1
(45) Date of Patent: Dec. 29, 2009

(54) SYSTEM AND METHODS FOR DEFINING A SOFTWARE BUILD

(75) Inventors: Dan Lottero, Milford, MA (US);
Stanislav Sosnovsky, Upton, MA (US);
Ruben Michel, Hopkinton, MA (US);
Richard Francis Cormier, Franklin, MA (US); Ilya Liubovich, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 1003 days.

(21) Appl. No.: 11/094,773

(22) Filed: Mar. 30, 2005

(51) Int. Cl.
*G06F 9/45* (2006.01)
(52) U.S. Cl. ...................................... 717/108
(58) Field of Classification Search ................ 717/126, 717/108
See application file for complete search history.

(56) References Cited

U.S. PATENT DOCUMENTS 5,758,160 A * 5/1998 McInerney et al. .......... 717/104

* cited by examiner

*Primary Examiner*—John Chavis
(74) *Attorney, Agent, or Firm*—Chapin IP Law, LLC; Barry W. Chapin, Esq.

(57) ABSTRACT

A software build framework includes and architecture to identify software components including sets of classes, or objects, and categorizes the objects into layers in the component. A set of build rules identifies allowable dependencies between the component layers among the same and other components in the system, as well as external entities such as off the shelf (OTS) and third party vendor products outside the development control. The build mechanism enumerates a set of dependencies for each of the components, and an enforcer analyzes the dependencies to identify dependencies in violation of the rules. The enforcer separates the compile time and runtime inheritance paths to detect indirect monolithic inheritance. In this manner, dependency rules define an efficient and optimal architecture which lends itself well to modifications, timely builds and deliverable releases, and enforces the dependency rules at compile time so as to avoid generating an obsolete or suspect build.

21 Claims, 9 Drawing Sheets

200
IDENTIFY A PLURALITY OF SOFTWARE ELEMENTS FOR INCLUSION IN A BUILD, THE SOFTWARE ELEMENTS COLLECTIVELY OPERABLE TO PROVIDE A SET OF INSTRUCTIONS AND DATA FOR OPERATION OF THE SOFTWARE SYSTEM

201
DESIGNATE, FOR EACH OF THE SOFTWARE ELEMENTS, A PLURALITY OF LAYERS, EACH OF THE LAYERS REPRESENTING A SET OF COMPILATION UNITS OPERATIVE TO PERFORM ACCORDING TO A PREDETERMINED FUNCTIONAL SCOPE

202
ENUMERATE A SET OF BUILD RULES INDICATIVE OF ALLOWABLE DEPENDENCIES BETWEEN THE LAYERS OF THE SOFTWARE ELEMENTS

203
DEFINE A SET OF DEPENDENCIES BETWEEN THE SOFTWARE ELEMENTS, THE DEPENDENCIES INDICATIVE OF AN ASSOCIATION BETWEEN THE DESIGNATED LAYERS OF THE SOFTWARE ELEMENTS

204
ENFORCE THE BUILD RULES BY ANALYZING THE DEFINED DEPENDENCIES AND IDENTIFYING DEFINED DEPENDENCIES THAT ARE CONTRARY TO THE ENUMERATED BUILD RULES

*Fig. 2*

SYSTEM AND METHODS FOR DEFINING A SOFTWARE BUILD

BACKGROUND

A large software development environment relies on many developers, or software engineers, developing systems including many software elements. Each software element includes multiple objects, and is spread across many files. Typically, the files include source code, or human readable versions, of computer instructions, and are modifiable by the developers. As is known in the industry, the source code is compiled into object code and eventually into executable code, which is a set of instructions executable by a processor on the target machine for which the system was developed. The process of transforming the source code to the executable (running) system is known as a build, and involves a series of transformations from source code to executable code.

Software objects in conventional software systems include or inherit methods and attributes from other objects in the system. Inheritance is usually defined in terms of classes, which inherit other classes (or subclasses), resulting in a complex hierarchical or matrix pattern of inheritance, often called an inheritance lattice. Inheritance results in a dependency between the objects or classes, as changes to a particular class triggers a need to propagate the change to classes which inherit, or depend on, the changed class. Such dependencies are resolved by a build, which recompiles the affected entities to propagate the changes to dependent classes. In a large software system, the build can become substantial, and a modification to a particular class or object can have a rippling effect which traverses the inheritance lattice defined by the dependencies.

Modern software development methodologies are exhibiting a trend toward so-called middleware based implementations. Middleware provides a vendor and platform independent interprocess communication mechanism using generic objects which may be instantiated under one platform or OS and received by another using the underlying mechanism provided by the middleware. A middleware based application may be ported, or rebuilt, simply by rebuilding on another middleware platform without modifying non-middleware aspects.

One popular middleware implementation is CORBA. CORBA is the acronym for Common Object Request Broker Architecture, OMG's open, vendor-independent architecture and infrastructure that computer applications use to work together over networks. Using the standard protocol IIOP, a CORBA-based program from any vendor, on almost any computer, operating system, programming language, and network, can interoperate with a CORBA-based program from the same or another vendor, on almost any other computer, operating system, programming language, and network.

Middleware such as CORBA may be beneficial in many situations. Because of the straightforward manner that CORBA integrates machines from so many vendors, with sizes ranging from mainframes through minis and desktops to hand-helds and embedded systems, it is the middleware of choice for large (and even not-so-large) enterprises. One of its most important, as well most frequent, uses is in servers that must handle large number of clients, at high hit rates, with high reliability.

CORBA applications are composed of objects, individual units of running software that combine functionality and data, and that frequently (but not always) represent something in the real world. In a typical middleware based object oriented architecture, there are many instances of an object of a single type—for example, an e-commerce website would have many shopping cart object instances, all identical in functionality but differing in that each is assigned to a different customer, and contains data representing the merchandise that its particular customer has selected. For other types, there may be only one instance. When a legacy application, such as an accounting system, is wrapped in code with CORBA interfaces and opened up to clients on the network, there is typically only one instance.

SUMMARY

In a large software system, a build operation performs the various build actions to transform source, or user modifiable code, into executable, or computer (machine) readable code. In a typical software system, there may be thousands of software elements and several stages of compilation and code generation to build the software system into an executable version from the source code. Each of the software elements typically includes many classes, or objects. Accordingly, it is beneficial to limit or optimize dependencies between such software elements.

In a storage area network development environment, the development effort may encompass a management application for storage arrays, hosts and other nodes in the storage area network (SAN). In such a development environment, changes to the software elements are driven by many factors, including release schedules, custom versions, patches, and incremental releases, to name several. The build operations should be deterministic such that changes made to the developer modifiable source code, or application code repository, do not have an unexpected effect on unchanged portions of the system. Changes to the system should have a predictable effect on other elements in the system, and inconsistencies in the changes should be detectable by the build. For example, removal of a particular element thought to be obsolete or superceded should not negatively impact the build for want of the removed element. Further, the build should act as a line of first defense, or "backstop," to isolate such issues should they occur. Accordingly, it would be beneficial to identify dependencies between software elements, and the objects contained therein, to provide a deterministic and predictable outcome to changes to the system and effected (promulgated) by the build.

Unfortunately, conventional build mechanisms suffer from several shortcomings. In a large development environment, it can be difficult and time consuming to identify all dependencies between software elements in the software system. Further, developers may have varying levels of familiarity with the environment, and ensuring absolute compliance with dependencies may be subject to a human factor. For example, a novice developer may be unaware of all dependencies relating to a software element to which they are making changes. Accordingly, opportunities for inconsistency arise.

Configurations of the invention are base, in part, on the observations that such inconsistencies between software elements are best handled as early in the build process as possible. A large software system, such as a SAN management application, presents a complicated dependency (inheritance) lattice resulting in a resource intensive build operation. Inconsistencies, such as misplaced or missing dependency references, can cause the build to fail, can result in an obsolete software element of object being employed, or can result in a runtime anomaly or error. Accordingly, it would be beneficial to define a set of build rules identifying allowable dependencies between the software elements such that developers may incorporate optimal and efficient dependency structures in developed software elements. It would be further beneficial to provide a build mechanism which enforces the dependencies to identify and correct inconsistencies prior to generating an apparent operational build, lest such an inconsistency become a runtime anomaly at a customer site, requiring field personnel and timely modifications to correct.

One particular distinction between the build system and architecture discussed herein and conventional build systems is that the former is designed for strict enforcement of inter-component and intra-component layer dependencies. The primary mechanism of dependency control is restriction of the Java compiler's source and class paths as intentionally defined by the software architect. The build system specifies a declarative domain specific language (DSL) for component, library, test and API layer dependency definition. The enforcement of intra-component layer dependencies may be hard-coded into the build system itself. The software architect or individual developers are responsible for defining component descriptors and the library dependency DSL. The build system, acting as a software factory schema (discussed further below), invokes the code generators and compilers (build processors) employed by the build system. Such tools include: IDL compiler, component compiler (COCO), java bridge generator (BRIDGEGEN), ECCAPI model and component generator (MODELGEN), and a conventional Java compiler (Javac), discussed further below.

In a typical conventional build environment, each class, or compilation unit, inherits or includes other classes which is dependent upon. These classes, in turn, inherit other classes, resulting in the inheritance lattice described above. In a large software system, the dependencies pursued by each class may be substantial. Since such dependencies trigger cumulative inheritance, the resulting inheritance lattice tends toward a monolithic environment in which few classes are hidden from other classes. In conventional build systems, unreferenced but needed dependencies ore often inherited indirectly via other classes. Further, unneeded classes are often not removed from the dependency (inheritance) traversal, pulling in additional, unnecessary classes which tends to promote the indirect inheritance and monolithic nature of the build environment. The overall effect is towards over inclusion, which causes the build to perform more slowly because of unnecessary dependency (inheritance references), and which increases the likelihood of indirect inheritance masking (saving) an otherwise misstated dependency. For example, if A depends on (inherits) B, and B inherits C, A generally has visibility into C. Even if A does not explicitly have a reference to C, the compiling entity will have access to C's definitions and will not flag A for want of a definition in C if A improperly (according to the rules) employs classes or objects in C.

Configurations discussed further below substantially overcome the above described shortcomings by providing a software architecture and build mechanism which enumerates a set of build rules applicable to software elements in a large software system, such as the SAN management application, and enforces the build rules during the build process to identify nonconforming dependencies and allow correction prior to full generation or delivery of a suspect build. The architecture identifies components including sets of classes, or objects, in a software element, or component, and categorizes the objects into layers in the component. A set of build rules identifies allowable dependencies between the component layers among the same and other components in the system, as well as external entities such as off the shelf (OTS) and third party vendor products outside the development control. The build mechanism enumerates a set of dependencies for each of the components, and an enforcer analyzes the dependencies to identify dependencies in violation of the rules. Further, the enforcer separates the compile time and runtime inheritance paths to detect indirect monolithic inheritance. In this manner, dependency rules define an efficient and optimal architecture which lends itself well to modifications, timely builds and deliverable releases, and enforces the dependency rules at compile time so as to avoid generating an obsolete or suspect build.

In further detail, the method of building a software system according to a set of architectural build rules discussed further below includes identifying a plurality of software elements (components) for inclusion in a build, in which the software elements are collectively operable to provide a set of instructions and data for operation of the software system, and designating, for each of the software elements, a plurality of layers, each of the layers representing a set of compilation units operative to perform according to a predetermined functional scope. An enumerated set of build rules is indicative of allowable dependencies between the layers of the software elements, and developers define a set of dependencies between the software elements, in which the dependencies are indicative of an association between the designated layers of the software elements. The build system enforces the build rules by analyzing the defined dependencies and identifying defined dependencies that are contrary to the enumerated build rules.

The build rules are employed to generate a set of build instructions operable to selectively invoke build actions based on the dependencies such that changes to a particular compilation unit initiate successive build actions on dependent compilation units according to the dependencies. The build instructions are aggregated in a build file, and the resultant invoked build actions may include compiling, inheriting, linking (i.e. binding labels), executing (code generators), and interpreting.

Further, in the managed information environment, generating the build file invokes a compile time classpath defining a network of dependencies between the compilation elements, and executing the deployable entities invokes a runtime classpath defining a network of dependencies between instantiated classes, in which the compile time classpaths and runtime classpaths are different. The classpaths enables enforcing to identify dependencies contrary to the build rules by identifying a compile time omission, rather than runtime failure.

In operation, the build system identifies a build target and corresponding build action, identifies dependent compilation units from the dependencies and conditionally performs the build action upon the build target when a dependent element corresponding to a dependency changes. An enforcer determines if the identified dependent compilation unit corresponds to the build rules, and enumerates, in the build file, if the compilation unit corresponds to the build rules, the identified compilation unit as corresponding to the build action. The enforcer therefore omits the identified compilation unit from triggering the build action if the compilation unit does not correspond to the build rules. In this manner, the enforcer validates the defined dependencies against the build rules, in which the build rules are operable to identify each dependency as valid or invalid, and generates the build file accordingly.

The successive build traverses the build file to identify build targets and corresponding build actions, and performs build actions corresponding to build targets identified from traversing. Because of omission of invalid dependencies, the build file identifies, if at least one of the build actions encounters a dependency contrary to the rules, the build target currently being attempted and indicates the corresponding failure (typically a undefined reference).

In the exemplary configuration, the developer defines a set of dependencies, each of the dependencies associating a layer of a first software element with a layer of a second software element, the associated layer of the first element dependent on the layer of the second software element, wherein changes to the layer of the second software element result in a build action to the layer of the first element. The layers lend an organization to the build such that the functional scope includes an architectural set (portion) and an application set, in which the application set including an interface layer and an implementation layer, and the architectural set includes a delegation layer and a middleware interaction layer. Accordingly, the build rules are further indicative of layers adapted to depend from other layers, for example restricting a higher layer from depending on a lower layer, in which the higher layers are defined by the public interface of the component. The rules further enable the enforcer to enforce build constraints by compiling software objects in the designated layers according to the dependencies, such dependencies further including intercomponent, intra-component, and external (runtime). The enforcer identifies dependency violations prior to runtime, such that the intra-component dependencies limit dependency on less public layers in the same component, the intra-component dependencies are limited to the interface of other components, and external dependencies limit dependency to predefined external entities.

In the exemplary arrangement, the build system executes a build script generator to generate a build script, in which the build script is operable to perform the build of each of the software elements according to the build rules and the dependencies. Each of the software elements is a component having a corresponding descriptor and at least one interface file, and each of the software elements is inclusive of a set of software objects, in which the software objects indicative of a class and compilable as an individual executable entity, in which each executable entity operable as an instantiation of the class.

Alternate configurations of the invention include a multi-processing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 2 is a flowchart of a software build operable in the managed information environment of FIG. 1;

DETAILED DESCRIPTION

Figure 1:
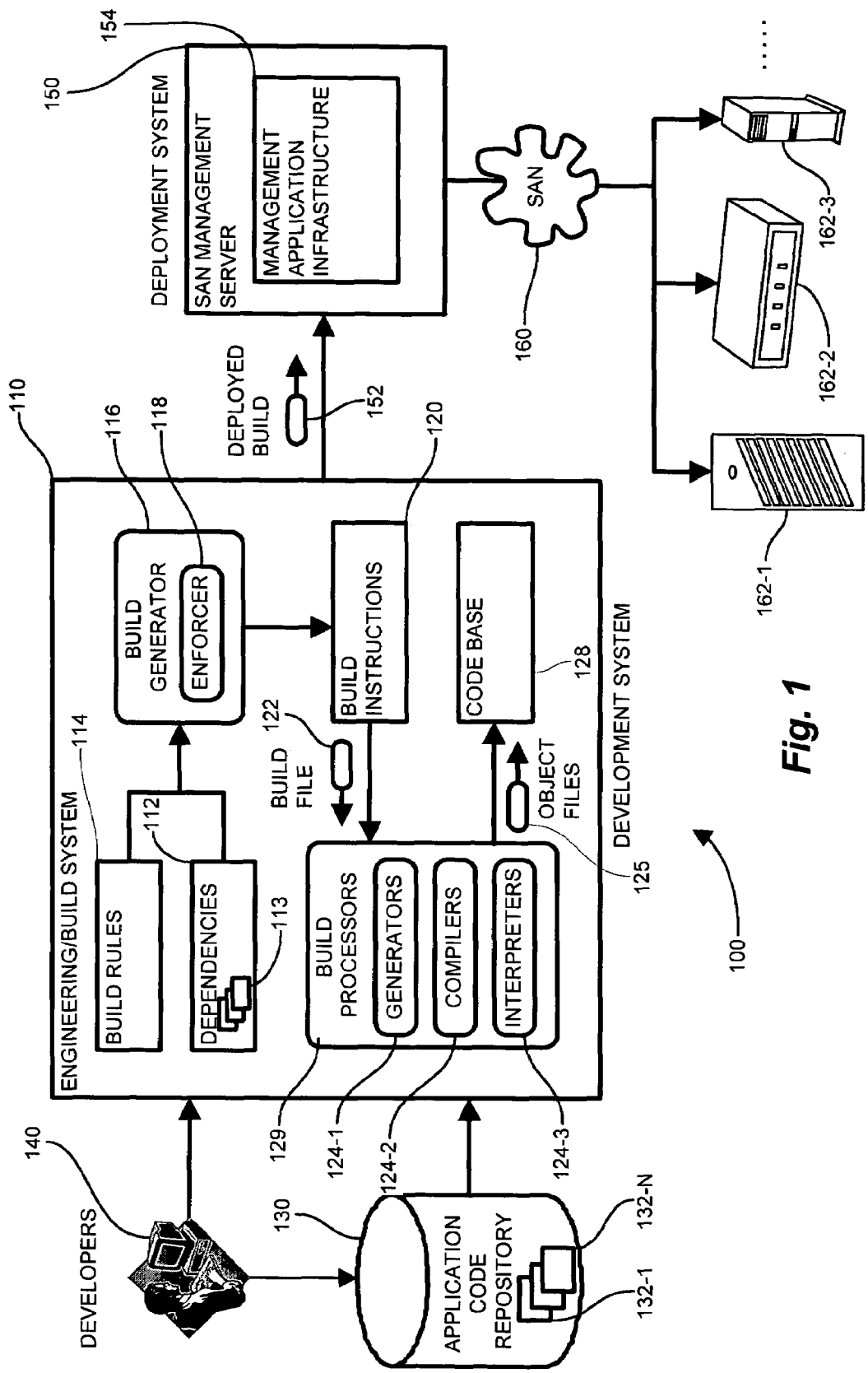
FIG. 1 is a context diagram of an exemplary managed information environment suitable for use with the present invention.

Embodiments of the invention are directed to techniques for strict enforcement of inter-component and intra-component layer dependencies. One particular mechanism of dependency control is restriction of the Java compiler's source and class paths as defined by the software architect. The build system specifies a declarative domain specific language (DSL) for component, library, test and API layer dependency definition. The enforcement of intra-component layer dependencies are defined into the build system itself. The software architect defines component descriptors and library dependency DSL. The build system, acting as a software factory schema (discussed further below), invokes code generators and compilers (build processors) invoked by the build system.

In a typical conventional build environment, each class, or compilation unit, inherits or includes other classes which is dependent upon. These classes, in turn, inherit other classes, resulting in the inheritance lattice described above. In a large software system, the dependencies pursued by each class may be substantial. Since such dependencies trigger cumulative inheritance, the resulting inheritance lattice tends toward a monolithic environment in which few classes are hidden from other classes. In conventional build systems, unreferenced but needed dependencies are often inherited indirectly via other classes. Further, unneeded classes are often not removed from the dependency (inheritance) traversal, pulling in additional, unnecessary classes which tends to promote the indirect inheritance and monolithic nature of the build environment.

Configurations discussed further below substantially overcome the above described shortcomings by providing a software architecture and build mechanism which enumerates a set of build rules applicable to software elements in a large software system, such as the SAN management application, and enforces the build rules during the build process to identify nonconforming dependencies and allow correction prior to generation or delivery of a suspect build. The architecture identifies components (e.g. software elements) including sets of classes, or objects, and categorizes the objects into layers in the component. A set of build rules identifies allowable dependencies between the component layers among the same and other components in the system, as well as external entities such as off the shelf (OTS) and third party vendor products outside the development control. The build mechanism enumerates a set of dependencies for each of the components, via a descriptor file, and an enforcer analyzes the dependencies to identify dependencies in violation of the rules. Further, the enforcer separates the compile time and runtime inheritance paths to detect indirect monolithic inheritance. In this manner, dependency rules define an efficient and optimal architecture which lends itself well to modifications and timely builds and deliverable releases, and enforces the dependency rules at compile time so as to avoid generating an obsolete or suspect build.

To illustrate a typical dependency, assume the architect has decided on the rule "A shall never depend on B". Sometime later, new developers come along without knowing the rule. Suppose they added an instantiation of B to the A.java source. The developers have effectively introduced a dependency into the code. Upon compilation of A.java, Javac (i.e. java compiler) will dutifully search for B.class in the classpath. Based on the project-specific dependency rules defined by the architect, the build system ensures that B.class will not be resolvable by the classpath. Javac then dutifully searches its sourcepath for B.java, so that it can compile it into the coveted B.class. Again based on the rules, the build system will make sure that B.java is not resolvable by the sourcepath. At that point, Javac has run out of options, and has no choice but to exit with a compilation error about B. This is the behavior the architect would like to enforce, since it immediately notifies developers that something is amiss, and prevents accidental dependencies from occurring.

In contrast, conventional build systems have a monolithic "src/java" directory, and a monolithic "class" directory, and Javac is given free reign to access all sources and classes. When a dependency rule is violated Javac compensates because it can either find the missing class in the all-encompassing classpath, or it can find the source in the all-encompassing src/java directory. The dependency rule violation may not manifest itself until run-time in the lab or (worse) in the field.

Configurations herein further distinguish conventional build arrangements because the compile-time classpaths and run-time classpaths are different. Conventional builds are bound by a mandate that the compile-time and run-time classpaths be the same. The novel build system discussed herein does not follow this model. To illustrate, suppose "A" depends on "B", and "B" depends on "C". At run-time, it is apparent that all three (A, B, C) should be in the classpath. In the designers' minds though, "A" is only allowed to depend on "B". Suppose the developer inadvertently instantiates "C" from within "A." This violates a dependency rule, and it would go unnoticed if at compile-time we used a classpath with A, B and C (because Javac would find C's class and compile everything). Suppose at some later date, developers decided that "C" was no longer needed, and "B" was modified to no longer depend on C. Based on the project design, "C" could then be thrown away—however "A" still illegally depends on it. One way to spot this problem up-front is to build "A" with only "B" in the compile-time classpath. In this manner, Java can't resolve "C" and will fail the build immediately.

Of significance is the notion that the build should fail if any dependency rules are violated. The intent is that issues must be resolved early in the development cycle, and not later when the product is already deployed. The build system, or mechanism, discussed herein is used in support of application server component development. Such components are particularly applicable to a component server as disclosed in copending U.S. patent application Ser. No. 11/096,246, filed Mar. 31, 2005, entitled "SYSTEM AND METHODS FOR IMPLEMENTING A SOFTWARE COMPONENT DEVELOPMENT ARCHITECTURE", assigned to the assignee of the present application and incorporated herein by reference. From the build system's perspective, a component is roughly equivalent to a set of deliverable artifacts (i.e. a jars). The rules governing component development, dependencies, and compilation are strict and follow a consistent pattern. The build system need only concern itself with the set of rules, and then build the components accordingly.

FIG. 1 is a context diagram of an exemplary managed information environment 100 suitable for use with the present invention. Referring to FIG. 1, the environment 100 includes a software engineering/build system 110, such as a LAN employed for software development and builds at a vendor site, coupled to an application code repository 130 for storing the software elements (components) 132 employed by the build, and proximate to developers 140 performing the actual design and coding activities. The build system 110 is coupled to a deployment system 150 operable to receive the deployable build 152 upon completion. The deployment system 150 is typically disposed at a customer site, coupled by a variety of mechanisms for physically transporting the deliverable code, such as the Internet, CD, tape, etc.

In the exemplary configuration, the deployment system 150 includes a Storage Area Network (SAN) management server and an associated SAN 160 having a plurality of associated SAN nodes, such as storage arrays 162-1, connectivity devices 162-2 and hosts 162-3 (162 generally), all operable to receive and execute a corresponding portion of the deployed build 152. The SAN management server 150 maintains a management application infrastructure 154, such as a SAN management application, for monitoring and managing the exemplary SAN. The management application infrastructure 154, in conjunction with the various SAN nodes 162, provide information retrieval services to a user community (not specifically shown). Optimal, efficient operation of the deployed build 152 on the SAN management infrastructure 154, therefore, provides uninterrupted, effective services to the user community.

Referring again to the engineering/build system 110, the build system 110 typically operates as a software engineering facility, or "software factory," for maintaining and developing a code base 128 of deliverable software to the users. The build system 110 employs a plurality of developer 140 modifiable software elements 132-1 . . . 132-N (132 generally), typically known as source code, in the application code repository 130. As indicated above, the software elements 132, or components, include and inherit other software elements 132, defining a set of dependencies 112. A set of build rules 114 define allowable dependencies 112 among the elements 132, discussed further below. A build generator 116, generates build instructions 120 referencing various build processor 124 (e.g. compilers and code generators) depending on the nature of the software elements (source code) 132. The build generator 116 includes an enforcer 118 responsive to the build rules 114 for maintaining allowed dependencies 112.

In operation, the build generator 116 generates build instructions 120, subject to the enforcer 118 to permit only allowed dependencies, for aggregation as a build file 122. The build file 122 includes a set of ordered commands, having build targets and build actions (discussed further below) to perform the build. The build file 122 invokes the build processors 124, such as code generators 124-1, compilers 124-2, and interpreters 124-3, for performing build actions on the software elements 132 to generate the build targets. In general, as is known in the art, software typically undergoes one or more transformations by such build processors 124 during a build to produce running application code (executable files) from human readable source code modifiable by the developers 140. The collective activity of the build file 122, therefore, produces object files 126 maintainable as a code base 128 representing a particular build. The code base 128 is transported to a deployment system 150, as indicated above, to effect delivery of the software system, such as the exemplary SAN management application. In a particular configuration, the exemplary SAN management application may be the EMC Control Center (ECC) Application, marketed commercially by EMC Corporation of Hopkinton, Mass.

Figure 4:
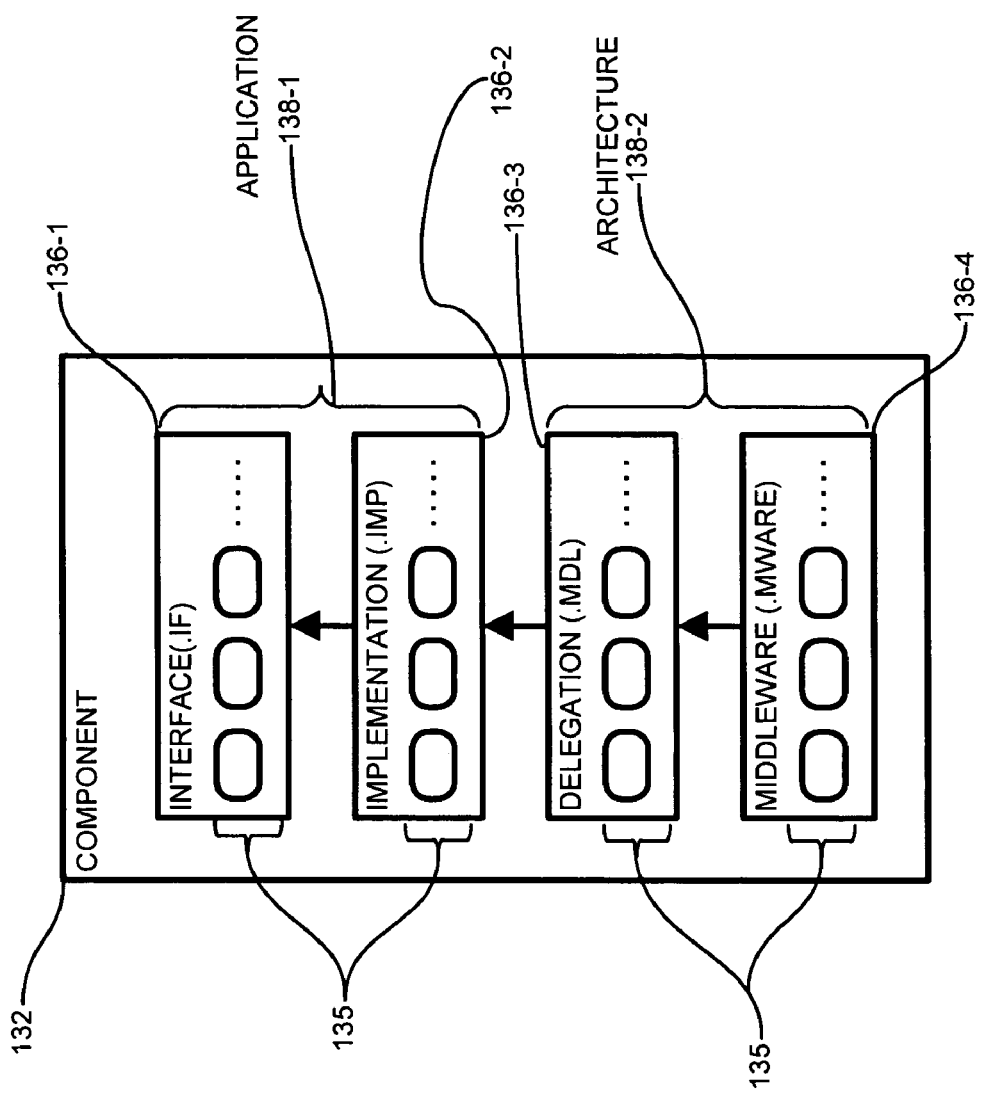
FIG. 4 is a block diagram of software architectural elements operable with the build schema of FIG. 3.

FIG. 2 is a flowchart of a software build operable in the managed information environment of FIG. 1. Referring to FIGS. 1 and 2, the method of building a software system according to a set of architectural build rules 114 as defined herein includes identifying a plurality of software elements 132 for inclusion in a build, in which the software elements are collectively operable to provide a set of instructions and data, i.e. code base 128, for operation of the software system 154, as depicted at step 200. The method designates, for each of the software elements 132, a plurality of layers, in which each of the layers represents a set of compilation units, such as individual object classes, operative to perform according to a predetermined functional scope, discussed further below in FIG. 4, depicted at step 201. A set of developers or other architecting entity enumerates a set of build rules 114 indicative of allowable dependencies between the layers of the software elements 132, as disclosed at step 202. The build rules 114 specify interactions, such as inheritance, inclusion, and other dependencies common in a software system, which are permissible depending on desirable coupling and cohesion between the software elements 132. As indicated above, optimal interactions between the software elements 132 facilitates modification and debugging, decreases build time and resources, and suppresses implementation details to allow the software elements to be approached as atomic units, without requiring excessive contextual knowledge about dependent software elements 132.

The developer 140 defines a set of dependencies 112 between the software elements 132, in which the dependencies 112 are indicative of an association between the designated layers of the software elements 132, as shown at step 203. The associations are typically constraints, such as inheritance and inclusion, which imparts to the build process a need to recompile or reprocess a dependent software element 132 or object prior to recompiling or rebuilding those from which it depends. An enforcer 118 enforces the build rules 114 by analyzing the defined dependencies and identifies defined dependencies 112 that are contrary to the enumerated build rules 114, as depicted at step 204. Typically, a found violation results in identification of the offending dependency and possible termination of the build pending correction of the improper dependency 112. Alternatively, a noncompliant build instruction may be met with a warning, if the deviation is minor. It is desirable to detect such deviations during the build stage at the build system 110, otherwise deviations may not be detectable until a deployed build fails at the deployment system 150.

It should be noted that the generally accepted notions of classes and objects as employed in the software industry are employed herein. In the discussion herein, an object is generally employed as an instantiation of a class, the class denoting a particular compilation unit. In contexts applicable to either runtime or compile time occur, a class refers to the compilation, or user modifiable source entity, and an object refers to a runtime instantiation of the compiled (executable) object. Where the distinction between runtime and compile time is not particularly significant, such as when classpaths for runtime and compile time are similar, this distinction bears less merit.

Figure 3:
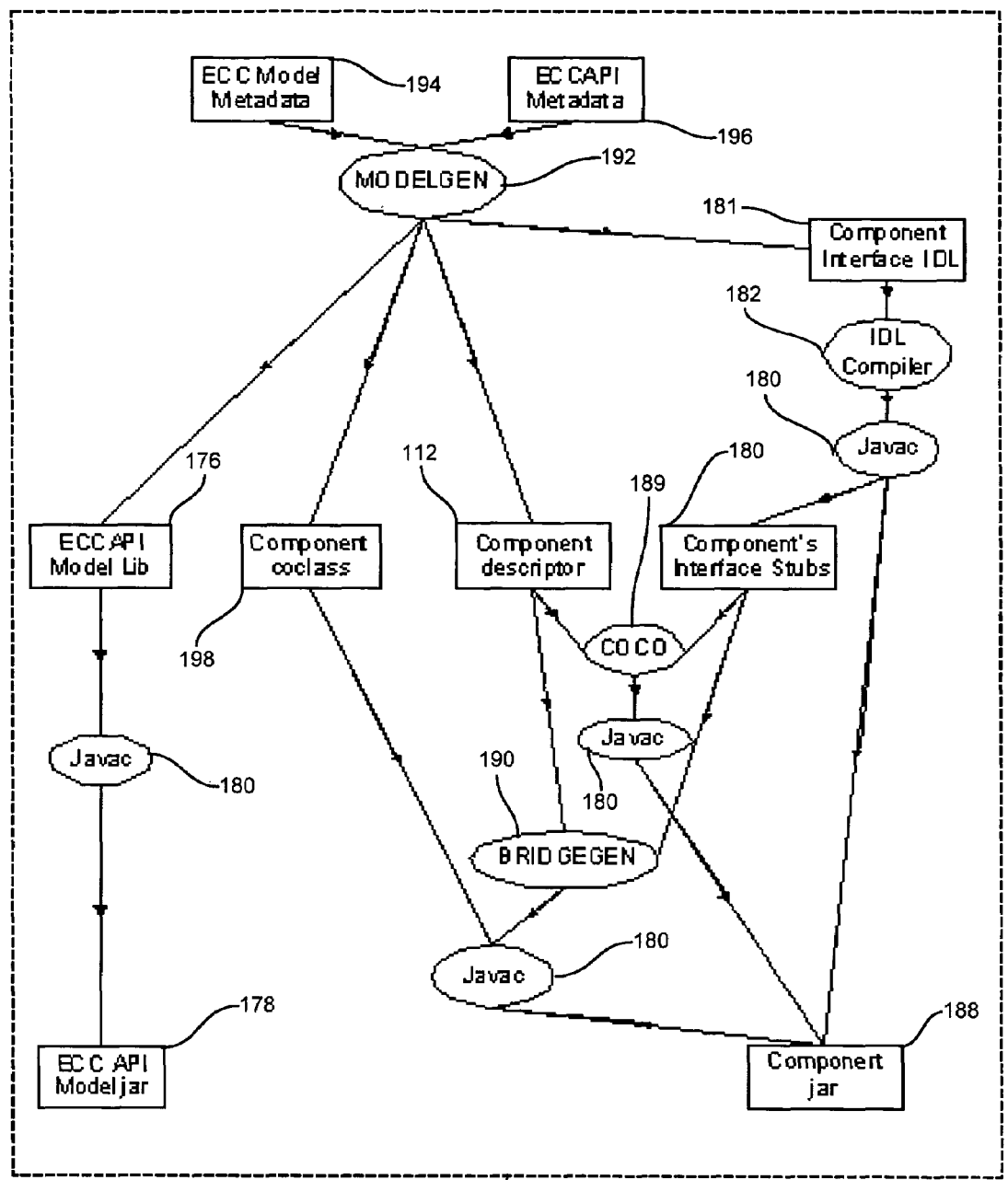
FIG. 3 is a schema diagram of software entities and processes invoked in an exemplary build according to the flowchart of FIG. 1.

FIG. 3 is a schema diagram of software entities and processes invoked in an exemplary build according to methods disclosed herein. Referring to FIG. 3, the build operation includes developer modifiable objects and generated (i.e. compiled or interpreted) objects which contribute to the build at different phases. In other words, output from one compiler or generator may be input to the next compiler or generator, possibly coupled with other source or generated files. Referring to FIG. 3, the software elements 132 invoked in the build are the developer 140 modifiable components employed in the exemplary CORBA based SAN management application. Each component consist of four layers: the interface layer (if), the implementation layer (imp), the middleware delegation layer (mdl), and the middleware layer (mware). The if & imp are "application" layers in that they contain only the business logic of the application domain. The mware & mdl are architectural layers. The mware makes component location transparent (remotable) using CORBA as middleware of choice. The mdl isolates mware from the application layers. Accordingly, CORBA stubs and skels are employed as is known in the art. Alternate middleware implementation may employ other invocation mechanisms.

In the application code repository 130, each component 132 has release code (that is, source code that makes up the component), test code, and meta-data in the form of a component descriptor XML file, defining the dependencies 112, (which is the primary input to various code generators). The code generation utilities (including the various build processors 124) that will be invoked include:

A CORBA IDL compiler 182, as is known in the industry
A "Component Compiler" (coco) 186 (
Bridge generator (BRIDGEGEN) 190
ECCAPI model and component generator (MODELGEN) 192
The Build System Generator 116

An "idl" file 181 (Interface Definition Language) is the input to the IDL compiler 182. The descriptor.xml 112 file is the input to COCO, BRIDGEGEN and the build system generator. The location of classes that result from these sources depends on the nature of the source. The ECC Model Metadata 194 defines classes indicative of the various entities in the storage area network, such as the storage arrays 162-1, connectivity devices 162-2, and hosts 162-3. The ECC API (Application Programming Interface) Metadata 196 defines classes indicative of the interfaces employed by the user application to invoke the resultant build. Both contribute to the ECC API model Lib 176, which is generated as Java code for compilation 180 into the ECC API model Jar 178, including built object and/or executable files for deployment with the component jar 188.

The IDL compiler 182 is invoked one or more times per component. The number of iterations is driven by the dependency tree learned from the descriptor.xml file 112. Generally speaking, the IDL compiler 182 can emit stubs or skeletons.

The stubs and skeletons will be redirected into their appropriate layers (as defined in the rules section. For example, INUT: /mware/*.idl OUTPUT: /mdl/src/java_stub/

OUTPUT: /mdl/src/java_skel/

OUTPUT: /mdl/src/java_bridge/

OUTPUT: /imp/src/java_bridge/

In addition to descriptor.xml files 112, input to COCO 186 includes the classes of the skel sources created by the IDL generator. Thus, it must be invoked after IDL is compiled and will take as its input the class directories that hold the compiled stubs and skels. Its output will be another source root under the component's mware directory:

INPUT: mdl/classes_skel/

OUTPUT: mware/src/java_coco/

In addition to the descriptor.xml files 112, input to BRIDGEGEN 190 includes the classes of the skel sources created by the IDL generator. Thus, it must be invoked after IDL is compiled and will take as its input the class directories that hold the compiled stubs and skels. Its output will be another source root under the component's imp & mdl directory. The bridge generator (BRIDGEGEN) is employed to implement bridging morphisms between the generic, middleware independent representation of the application, codified in the application portion layers 138-1, and the middleware specific representation, discussed herein as a CORBA based implementation. Further details concerning the bridging morphism may be found in copending U.S. patent application Ser. No. 11/095,406, filed Mar. 31, 2005, entitled "METHODS AND APPARATUS FOR CREATING MIDDLEWARE INDEPENDENT SOFTWARE", incorporated herein by reference.

In an exemplary configuration, the build instructions 120 define the build file 122 generated by the build generator 116, including a perl script engine driving the build generator 116. The resultant build file 122 is received by a build utility for executing the build actions in the build file 122, which in the exemplary configuration is the Ant utility, represented as the build processors 124. Therefore, the build generator 116 produces the eabuild/build.xml file that Ant will use. The batch file is a driver interface to the perl script. The ant.pl and LogText.pm files are both symbolic links to the same files that facilitate the main build system. A user properties template provides an example of how the user can perform adhoc modifications to the compilation process. The code base 128 resulting from the build file 122 is a set of jar kits. A kit is simply a collection of categorized jar files. An installation is a directory tree with jars and other files placed in a way similar to a real installation (with the addition of tests and test components which aid the developer in debugging). A component coclass 198 represents application functionality invoked by or included by the component 132 being built, and includes substantial application functionality, i.e. developer coding effort.

As indicated above, the build system 116 employs Ant to drive the low-level actions of compilation, and will use Ant's inherent dependency-checking mechanism and Javac interface to enforce rules. Due to the complexity of the rules, the number of individual classpaths to manage, and the expectation that the number of components 132 could grow well into double-digit figures, an Ant file generator is employed, however alternate configurations may employ a makefile or other build file, for example. Note that the generator 116 enforces dependencies by disallowing build actions and conditions in the build file 122. It therefore simply create an XML file (based on the descriptor 113 *.xml files, and the build rules 114) suitable for Ant, and then it will let Ant analyze for missing or circular dependencies upon Ant's invocation.

With respect to dependency processing, the build script generator's 116 input are the descriptor.xml 113 of each component, depend.xml of libraries, tests, and the API (interface) layer. The generator 116 will loop through all component 132 descriptor.xml files 113 and store metadata in a series of associative arrays.

The descriptor.xml file 113, exemplified below in Table I, is used by three build processors 124: the build script generator, COCO, BRIDGEGEN (during compilation), and the component server/framework (during run-time). There are many elements and attributes, but only a small portion are typically significant to the build script generator 116.

A "label" attribute of each component provides the real name of the component 132, and the "version" attribute may be used later for jar file creation. The "system" attribute lets us know whether this component is a system component or a user component (it has a subtle effect on the compilation classpath). A "test" attribute defines whether or not a component is a test component (it has a subtle effect on kitting).

Based on such information, and the general rules for intra-component/inter-layer dependencies and inter-component dependencies, the build generator 116 can create the Ant targets for any given component layer. Furthermore, for each component, the build system 110 determines its immediate dependencies and the full recursion of its dependencies. For example, if A depends on B and B depends on C, then A's immediate dependency is B; further, A's fully recursed dependency is B and C. These relations are illustrated further below in the component 132 dependencies and build rules 114 examples of FIG. 9 and Table II.

FIG. 4 is a block diagram of software architectural elements 132 operable with the build schema of FIG. 3. Referring to FIGS. 1-4, in an exemplary configuration, the software elements 132 are components, each having four layers 136-1 ... 136-4 (136, generally). The layers are for separation middleware details from application code logic, and may include additional layers in alternate configurations. Each layer 136 includes a set of code objects 135, or source code classes, which are independent compilation units receivable by a compiler 124-2 or other build processor 124 for generating a build target (e.g. compiled object file). In the exemplary arrangement shown, an interface later 136-1 includes the visible aspects (attributes and methods) employable by other components 132 for invoking this component. An implementation layer 136-2 includes objects indicative of much of the application logic and processing. The interface and implementation layers 136-1,136-2 define an application portion 138-1 of the component 132.

A middleware delegation layer 136-3 includes identifiers for invoking middleware references and operations, and a middleware layer 136-4 includes processing logic for middleware invocations. The middleware delegation layer 136-3 and middleware layer 136-4 further define the middleware portion 138-2 of the component 132. In the exemplary configuration, separation of the middleware portion 138-2 allows seamless rebuilding of the application functionality defined by the application portion, which constitutes much of the SAN management application in the deployed build 152, for ease of portability.

Figure 5:
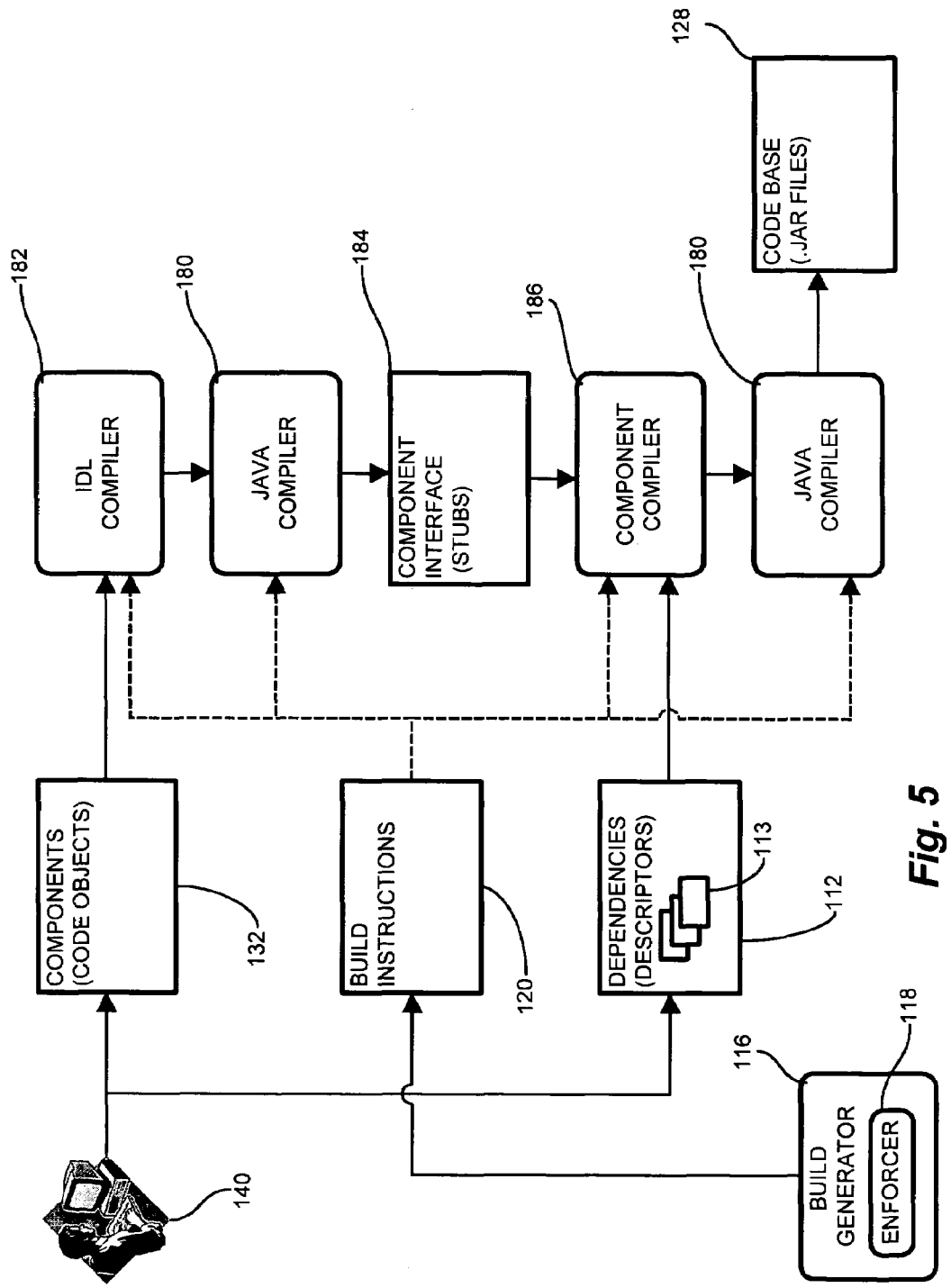
FIG. 5 is a block diagram of build execution using the elements of FIG. 4.

FIG. 5 is a block diagram of build execution using the elements of FIG. 4. FIG. 5 includes some of the same entities from FIG. 3 in context to illustrate the enforcement of the build rules 114 through the dependency definition and compilation phases. Referring to FIG. 5, the build instructions 120 resulting from the validated build file 122 described in FIGS. 1 and 2 perform the build actions on the build targets as outlined in the schema of FIG. 3. The build instructions 120 direct the IDL compiler 182 to compile the components 132 coded by the developers, and the results are received by a Java compiler 180 to generate the component interfaces 184. The component compiler 186 receives the interface 184 and the dependencies 112 which identify which other objects 135 in a component 132 that depend on a build target object 135 (recall that the components 132 are groupings of code objects 135 arranged in function/scope specific layers). In the exemplary configuration, the dependencies 112 are defined in script files 113 such as the descriptor.XML file of Table I. The component compiler 186 generates Java code compilable by the Java compiler 180 to produce the code base 128 .jar files.

TABLE I

```
<?xml version="1.0" encoding="utf-8"?>
<!-- Component A component descriptor -->
<Component
    label           =   "ComponentA"
    version         =   "1.0"
    cif_version     =   "2.2"
    compsrv_version =   "3.3"
    test            =   "yes"
    type            =   "service"
    coclass         =   "com.emc.eccapi.A.SomethingElse"
    desc            =   "The provider of the elusive A
functionality."
    active_on_startup  =   "yes"
    active_on_demand   =   "yes"
    system          =   "yes"
    synchronized    =   "yes">
    <!-- The 'source' attribute of the 'Interface' element is
reserved -->
    <Interface
        id          =   "ComponentA"
        repoid      =   "IDL:com/emc/eccapi/A/ComponentA:1.0"
        public      =   "yes"
        source      =   "src/com/emc/eccapi/A/ComponentA.idl"
        desc        =   "The sole interface of the component."/>
    <!-- The component consists of these files: -->
    <File
        name        =   "ComponentA"
        type        =   "JAR"
        debug       =   "yes"
        source      =   "lib/ComponentA.jar"/>
    <!-- The component depends on the following components: -->
    <Dependency
        label       =   "ComponentB"
        subdir      =   "B"
        version     =   "1.0a"/>
    <Dependency
        label       =   "ComponentC"
        subdir      =   "C"
        version     =   "2.0a"/>
    <!-- The component requires the folowing libraries -->
    <Lib name = "dom.jar"      version = "1.0"/>
    <Lib name = "xerces.jar"   version = "2.0"/>
    <Lib name = "toplink.jar"  version = "3.4"/>
</Component>
```

Figure 6:
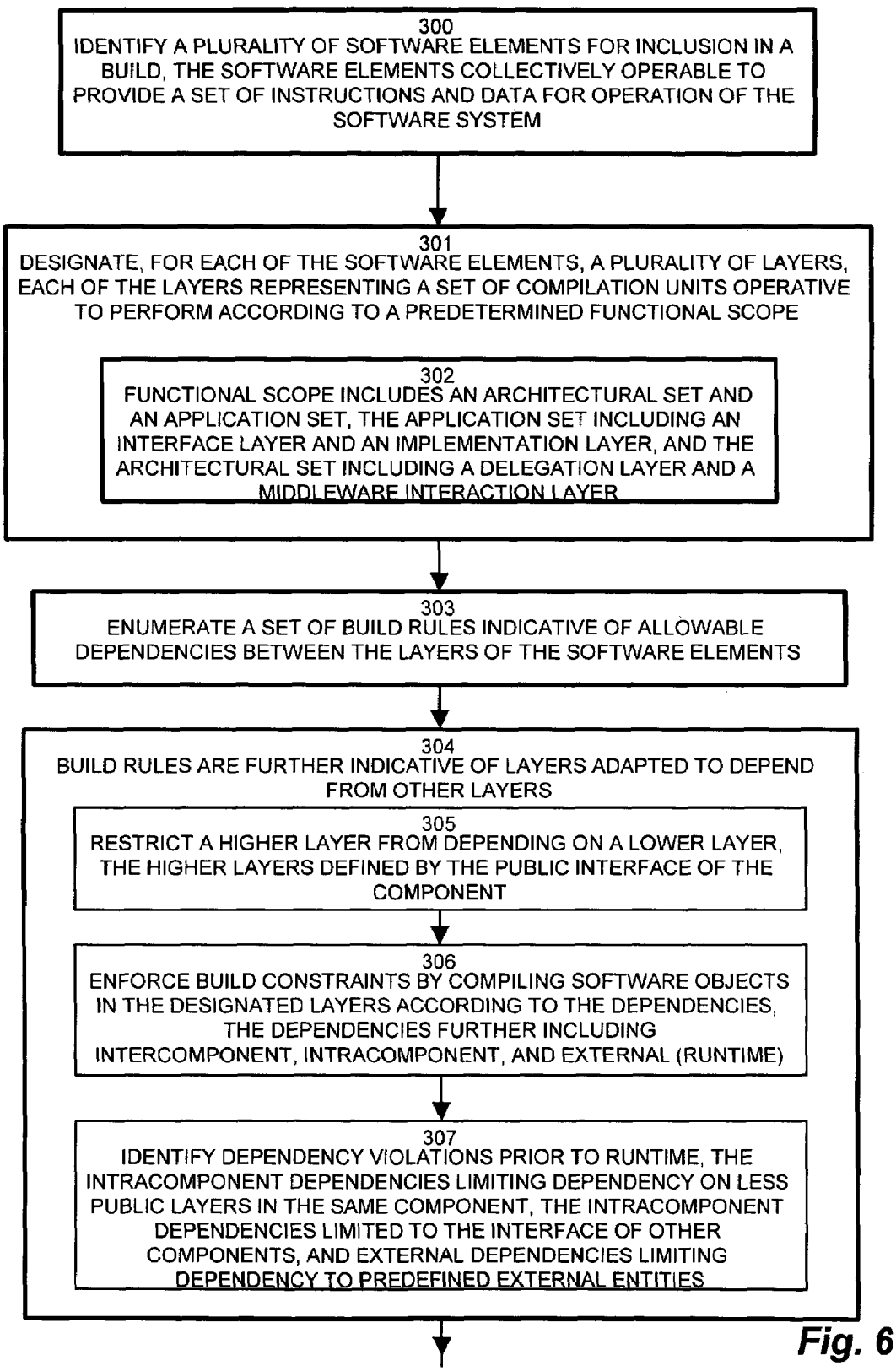
FIGS. 6-8 are a flowchart in further detail of build generation and deployment according to the elements of FIG. 5.
Figure 7:
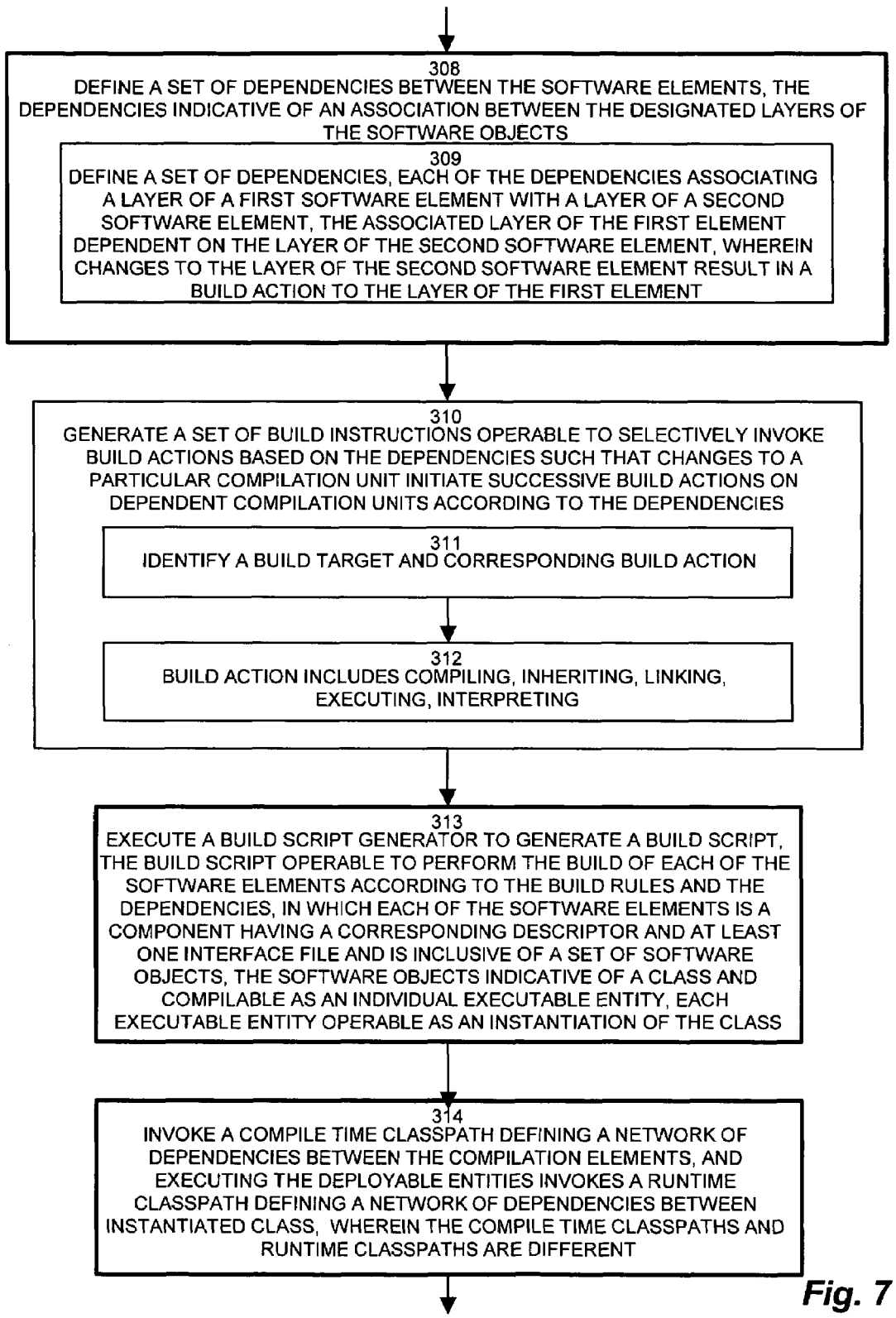
Figure 8:
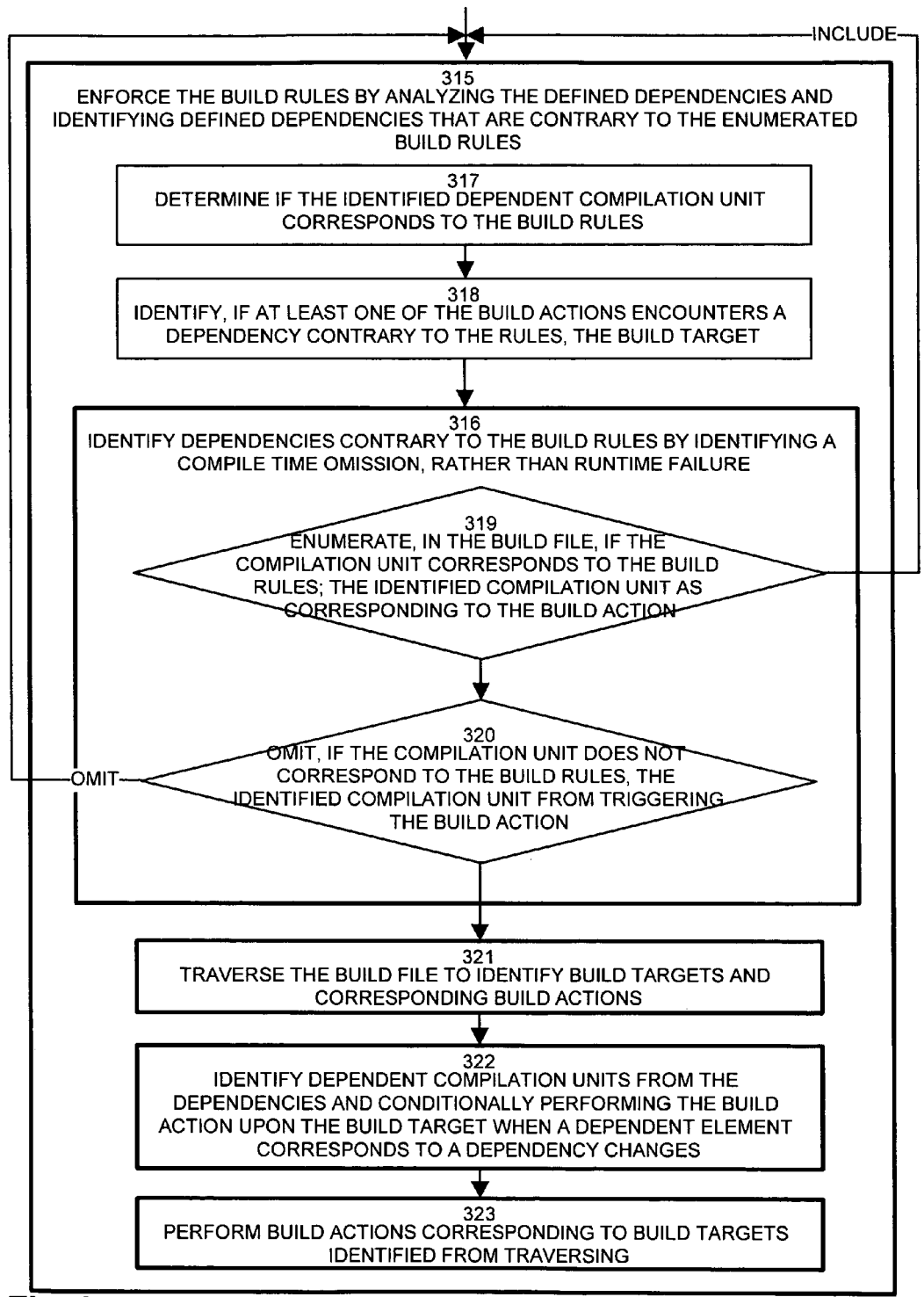

FIGS. 6-8 are a flowchart in further detail of build generation and deployment according to the elements of FIG. 5. In further detail, in an exemplary arrangement employing CORBA as the middleware, the build system 110 identifies a plurality of software elements 132 for inclusion in a build, in which the software elements are collectively operable to provide a set of instructions and data for operation of the software system, as shown at step 300. As described above, a developer 140 designates, for each of the software elements 132, a plurality of layers 136, in which each of the layers 136 represent a set of compilation units 135 operative to perform according to a predetermined functional scope, depicted at step 301 and shown in FIG. 4. For each element 132, or component, the functional scope includes and an application partition 138-1 and an architectural partition 138-2, in which the application partition includes an interface layer 136-1 and an implementation layer 136-2, and the architectural set includes a delegation layer 136-3 and a middleware interaction layer 136-4, as depicted at step 302. The architectural partition 138-2 handles interactions with the underlying middleware, such as CORBA, and accordingly, compartmentalizes the middleware interface to allow portability to an alternate middleware platform.

A developer or design team enumerates a set of build rules 114 indicative of allowable dependencies between the layers of the software elements, as shown at step 303 and illustrated in an exemplary manner below in Table II. The build rules define, from an architectural and/or methodology standpoint, allowable dependencies such that dependencies which increase complexity, trigger excessive recompiles, or tend to hide visibilities which may mask errors or inconsistencies are avoided.

In the exemplary configuration, using the layer 136 architecture of FIG. 4, the build rules 114 are further indicative of the layers 136 which are adapted to depend from other layers 136, as shown at step 304. Such build rules include restricting a higher layer 136 from depending on a lower layer, the higher layers defined by the public interface of the component 132, as depicted at step 305, enforcing build constraints by compiling software objects 135 in the designated layers 136 according to the dependencies, the dependencies further including intercomponent, intra-component, and external (runtime), as shown at step 306, and identifying dependency violations prior to runtime, the intra-component dependencies limiting dependency on less public layers in the same component, in which the intra-component dependencies are limited to the interface of other components, and external dependencies limiting dependency to predefined external entities, as disclosed at step 307.

Developers 140 define a set of dependencies 112 between the software elements 132, in which the dependencies are indicative of an association between the designated layers 136 of the software components 132, as depicted at step 308. In particular contexts, each of the defined dependencies associates, for example, a layer of a first software 132 element with a layer of a second software element 132, the associated layer of the first element dependent on the layer of the second software element, such that changes to the layer of the second software element result in a build action to the layer of the first element, as shown at step 309. Therefore, the build dependencies identify files which are recompiled based on changes to other files. Such changes may be source code changes made by developers 140, or object code changes made by recompilations of files.

By traversing the dependencies, the build generator 116 generates a set of build instructions, in which the build instructions are operable to selectively invoke build actions based on the dependencies such that changes to a particular compilation unit trigger a recompilation of dependent entities, such as a class or object 135, as shown at step 310. Each of the resultant build instructions 120 initiate successive build actions on dependent compilation units 135 according to the dependencies 112. Accordingly, the build generator 116 identifies a build target, such as a .jar (object) file 126 and corresponding build action, as depicted at step 311. Depending on the nature of the dependent file, the resultant build action may includes compiling, inheriting, linking (i.e. binding labels), executing (code generators), or interpreting, as shown at step 312, and invoke the corresponding build processors 124.

Therefore, the build process includes executing the build script generator 116 to generate a build script, or file 122, in which the build script 122 is operable to perform the build of each of the software elements 132 according to the build rules 114 and the dependencies 112, in which each of the software elements 132 is a component having a corresponding descriptor 113 and at least one interface file, and each of the software elements 132 is inclusive of a set of software objects 135. The software objects are indicative of a class and are compilable as an individual executable or object entity (i.e. a .jar file 126), in which each executable or compiled entity is operable as an instantiation of the class, as depicted at step 313. Further, generating the build file 122 invokes a compile time classpath defining a network of dependencies 112 between the compilation elements 132, such that executing the resulting deployable entities 152 invokes a runtime classpath defining a network of dependencies 112 between instantiated class. However, the compile time classpaths and runtime classpaths are different, as shown at step 314. Separation of the runtime and buildtime (compile time) classpaths provides the separation to avoid the monolithic, cumulative inheritance described above.

The build system 110 enforces the build rules 114 by analyzing the defined dependencies 112 and identifying defined dependencies 112 that are contrary to the enumerated build rules 114, as shown at step 315. The enforcer 118 therefore validates the defined dependencies 112 against the build rules 114, in which the build rules 112 are operable to identify each dependency as valid or invalid, thus building the build file 122. Enforcing the allowed dependencies 112 includes identifying dependencies contrary to the build rules 114 by identifying a compile time omission, rather than runtime failure, as shown at step 316. Build issues are correctable during development, and therefore avoids masking errors which might occur as runtime issues after release, i.e. at a customer site. The enforcer 118 therefore determines if the identified dependent compilation unit 135 corresponds to the build rules as shown at step 317. In the exemplary configuration, the enforcer 118 identifies, if at least one of the build actions encounters a dependency contrary to the build rules 114, the build target, as shown at step 318, and performs the following conditional branches. The build generator 116 enumerates, in the build file 122, if the compilation unit 135 corresponds to the build rules, the identified compilation unit as corresponding to the build action, as shown at step 319. Therefore, the build generator 116 writes a build instruction 120 to effect the build action appropriate to the compilation unit 135, typically invoking one or more of the build processors 124-N. In contrast, the build generator 116 omits, if the compilation unit 135 does not correspond to the build rules 114, the identified compilation unit from triggering the build action, as shown at step 320. Therefore, resultant execution of the build file 122 fails because of the omitted improper dependency, flagging further development activity for correction.

Following generation of the build file 122, execution of the build file causes the build system 110 to traverse the build file 122 to identify build targets and corresponding build actions, as shown at step 321. The build system 110 identifies dependent compilation units 135 from the dependencies 112 codified in the build file 122 and conditionally performs the build action upon the build target when a dependent element corresponds to a dependency change, as discussed above with respect to the build processors 124-N. The build system 110, responsive to the build file 122, invokes the corresponding build processors 124 to perform the build actions corresponding to build targets identified from the traversal of the build file 122, thus resulting in the deployed build 152 defining the application for execution on the management application infrastructure 154.

Figure 9:
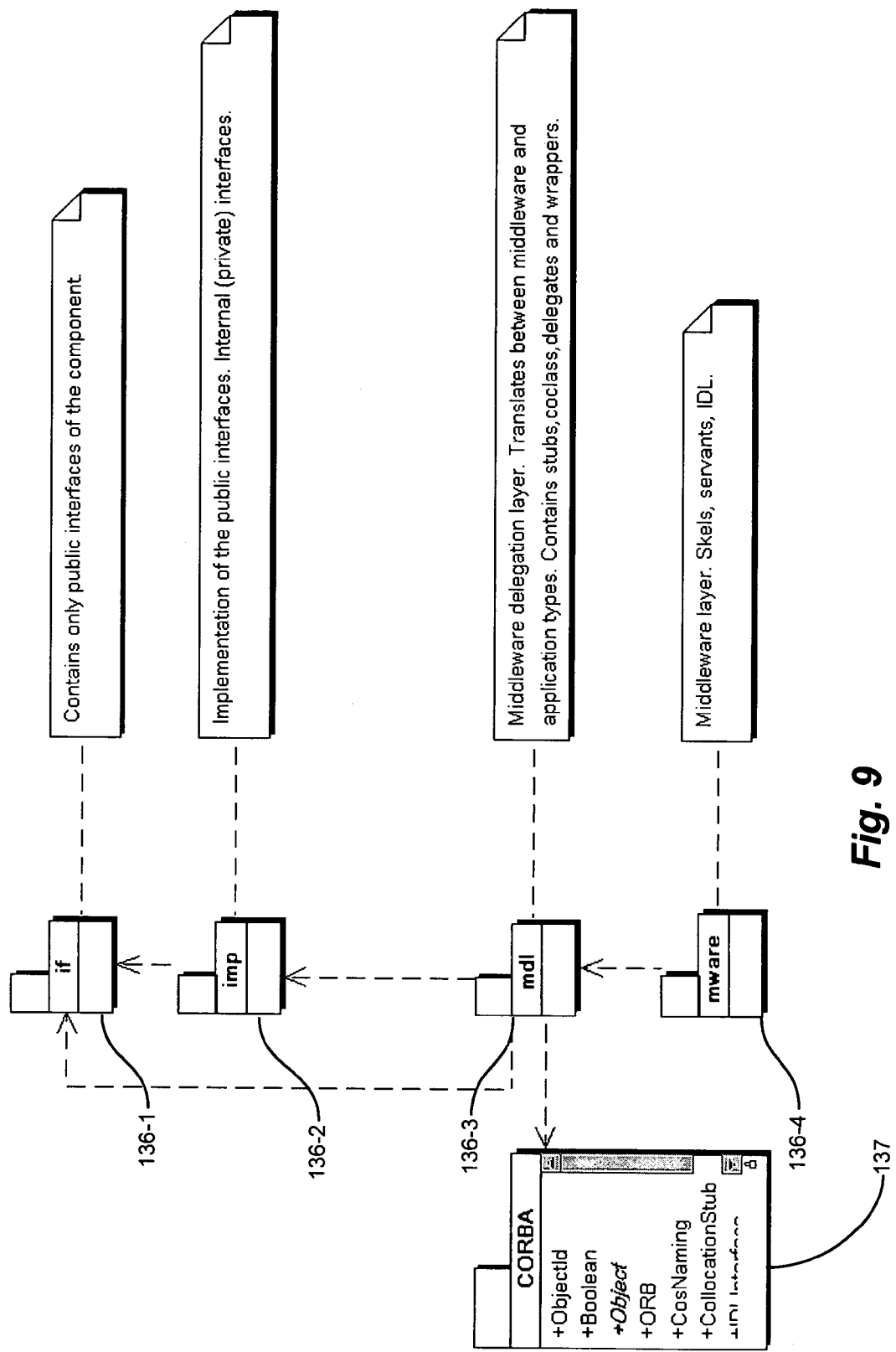
FIG. 9 is a diagram of intra-component dependencies in FIGS. 6-8.

FIG. 9 is a diagram of intra-component dependencies, and table II illustrates an exemplary set of build rules 114 corresponding to the dependencies. Referring to FIG. 9, the interface (.if) 136-1, implementation (.imp) 136-2, middleware delegation (.mdl) 136-3 and middleware (.mware) 136-4 layers are shown along with CORBA attributes 137.

TABLE II

1. Intra-component layer dependencies are
   a. its own if SHALL NOT depend on its other layers
   b. its own imp MAY depend only on its own if
   c. its own mdl MAY depend only on its own imp (and its own if in order to reduce overhead)
   d. its own mware MAY depend on its own mdl
2. Inter-component dependencies are:
   a. its own if MAY depend on the if of other directly-depended-upon components
   b. its own imp MAY depend on the if of other directly-depended-upon components
   c. its IDL file(s) MAY include other directly-depended-upon components' IDL files
   d. its IDL file(s) MAY include the cif component library's IDL files
3. External dependencies for all layers are:
   a. it MAY depend on all libraries specified in its descriptor.xml
   b. it MAY depend on the cif component library (both "user" & "system" components)
   c. it MAY depend on the compsrv component library only if it is a "system" component or the component descriptor explicitly introduced such library dependency.
   d. the only exception to the rule above is that the source code generated by COCO and BRIDGEGEN MAY depend on the compsrv library, even in "user" components.
4. All components SHALL have at least one IDL file, located only in its mware.
5. All components SHALL have one descriptor.xml file, located under the component subdirectory.
6. A component might not have all layer-specific source dir(s) in clearcase. Some might be 100% generated.
7. IDL generation for a given component:
   a. it SHALL produce stubs (for directly-depended-upon components) only in the component's mdl
   b. it SHALL produce skeletons only in the component's mdl
8. COCO invocation for a given component
   a. it SHALL produce its output only in the component's mware
9. BRIDGEGEN SHALL produce its output only in the component's imp & mdl layers.
10. Regarding the MCS and MODELGEN,
    a. it SHALL depend only on its static metadata inputs
    b. it SHALL output its files anywhere under the eacomp & eaexec & eacomplib directory trees.
    c. it SHALL produce as output an exact list of all files produced, and this file must be suitable for integration into the build system's cleaning targets.
11. If metadata files, or dependencies defined in metadata files change, then the build system should either warn that a rebuild is needed, or force a rebuild. Metadata files are IDL files, descriptor.xml and depend.xml files and generated by MCS metadata files, if any.

Note, for each invocation of the IDL compiler 182, it will need an include path containing the directories for that component's 132 fully-recursed dependency tree. The reason is that by nature, one IDL can use "#include" to included another, and that IDL can in turn include another IDL from another component. Regardless of whether or not the compiler 182 is asked to emit stubs, skels, or anything, it still parses all include statements. Accordingly, the include path considers all legal possibilities.

For example, suppose the descriptor.xml 113 files reveal that A depends on B, and B depends on C. It is possible for A's HDL to include B, and for B's IDL to include C. So, the include path used to parse A.idl must include directories for B and C. However, the include path used to parse B.idl must only include C. This way, the build system can catch errors. Suppose B.idl also included D.idl (an IDL from the D component)—then the build would die when the IDL compiler couldn't find the include file. Note, developers could avoid this problem by defining an absolute or relative path to D.idl, thus avoiding the need for the IDL compiler to consult the include path. It is understood that the developers will not attempt to defeat the build system in this manner, since it is beneficial to allow the build system spot errors at compile time.

Those skilled in the art should readily appreciate that the programs and methods for defining and enforcing software build dependencies and visibility as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for defining and enforcing software build dependencies and visibility has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of building a software system according to a set of architectural build rules comprising:
   identifying a plurality of software elements for inclusion in a build, the software elements collectively operable to provide a set of instructions and data for operation of the software system;
   designating, for each of the software elements, a plurality of layers, each of the layers representing a set of compilation units operative to perform according to a predetermined functional scope;
   enumerating a set of build rules indicative of allowable dependencies between the layers of the software elements;
   defining a set of dependencies between the software elements, the dependencies indicative of an association between the designated layers of the software elements; and
   enforcing the build rules by analyzing the defined dependencies and identifying defined dependencies that are contrary to the enumerated build rules;
   identifying a build target and corresponding build action;
   identifying dependent compilation units from the dependencies and conditionally generating build instructions for performing the build action upon the build target when a dependent elements corresponding to a dependency changes;
   determining if the identified dependent compilation unit corresponds to the build rules;
   enumerating, in the build file, if the compilation unit corresponds to the build rules; the identified compilation unit as corresponding to the build action, and
   omitting, if the compilation unit does not correspond to the build rules, the identified compilation unit from triggering the build action.

2. The method of claim 1 further comprising generating a set of build instructions, the build instructions operable to:
   selectively invoke build actions based on the dependencies such that changes to a particular compilation unit initiate successive build actions on dependent compilation units according to the dependencies.

3. The method of claim 2 wherein generating the build file invokes a compile time classpath defining a network of dependencies between the compilation elements, and executing the deployable entities invokes a runtime classpath defining a network of dependencies between instantiated class, wherein the compile time classpaths and runtime classpaths are different.

4. The method of claim 3 wherein enforcing further comprises identifying dependencies contrary to the build rules by identifying a compile time omission, rather than runtime failure.

5. The method of claim 1 further comprising:
   traversing the build file to identify build targets and corresponding build actions;
   performing build actions corresponding to build targets identified from traversing; and
   identifying, if at least one of the build actions encounters a dependency contrary to the rules, the build target.

6. The method of claim 5 wherein defining further includes defining a set of dependencies, each of the dependencies associating a layer of a first software element with a layer of a second software element, the associated layer of the first element dependent on the layer of the second software element, wherein changes to the layer of the second software element result in a build action to the layer of the first element.

7. The method of claim 1 wherein the functional scope includes an architectural set and an application set, the application set including an interface layer and an implementation layer, and the architectural set including a delegation layer and a middleware interaction layer.

8. The method of claim 7 wherein the build rules are further indicative of layers adapted to depend from other layers, further comprising:
   restricting a higher layer from depending on a lower layer, the higher layers defined by the public interface of the component.

9. The method of claim 8 wherein enforcing further comprising enforcing build constraints by compiling software objects in the designated layers according to the dependencies, the rules further indicative of:
   intercomponent, intra-component, and external dependencies; and
   identifying dependency violations prior to runtime, the intra-component dependencies limiting dependency on less public layers in the same component, the intra-component dependencies limited to the interface of other components, and external dependencies limiting dependency to predefined external entities.

10. The method of claim 1 further comprising executing a build script generator to generate a build script, the build script operable to perform the build of each of the software elements according to the build rules and the dependencies, wherein:
  each of the software elements is a component having a corresponding descriptor and at least one interface file; and
  each of the software elements is inclusive of a set of software objects, the software objects indicative of a class and compilable as an individual executable entity, each executable entity operable as an instantiation of the class.

11. The method of claim 1 further comprising:
  defining a set of layers, each of the layers including a set of components according to a predetermined functional scope of the compilation units in the layer;
  imposing a layering scheme on the build, each compilation unit belonging to one of the layers, such that build rules enforce inter layer dependencies between components; the build rules avoiding a monolithic inheritance lattice having unutilized dependencies, the unutilized dependencies requiring compilation of compilation units prior to compilation of uninherited compilation units, the unutilized dependencies requiring compilation prior to uninherited compilation units.

12. The method of claim 11, further comprising:
  specifying, in the build rules, allowed inheritances between components based on the layers to which inherited components belong by restricting estrict predetermined source and class inheritance paths;
  identifying dependencies that are contrary to the build rules by validating the defined dependencies against the build rules, the build rules identifying each dependency as valid or invalid and omitting invalid dependencies;
  generating a build file absent of the identified contrary dependencies, the generated build file defining a compile time classpath defining allowed inheritances between compiled components and a runtime classpath defining inheritance of classes instantiated by execution, the runtime classpath independent from the compile time classpath.

13. The method of claim 1 further comprising:
  grouping each of the software elements into layers of compilation units, each of the compilation units belonging to a layer;
  defining and receiving dependencies, the dependencies indicative of at least one of a compile time and runtime inheritance between the compilation units;
  analyzing the dependencies by applying the enumerated build rules; and
  generating build file having build instructions by including build commands that satisfy the applied build rules.

14. A computing device for performing a software build according to a set of architectural build rules comprising:
  a memory and processor comprising a code repository having a plurality of software elements for inclusion in a build, the software elements collectively operable to provide a set of instructions and data for operation of the software system;
  an architectural schema designating, for each of the software elements, a plurality of layers, each of the layers representing a set of compilation units operative to perform according to a predetermined functional scope;
  a set of build rules indicative of allowable dependencies between the layers of the software elements;
  a set of dependencies between the software elements, the dependencies indicative of an association between the designated layers of the software elements; and
  an enforcer operable to enforce the build rules by analyzing the defined dependencies and identifying defined dependencies that are contrary to the enumerated build rules, the enforcer for:
    identifying a build target and corresponding build action;
    identifying dependent compilation units from the dependencies and conditionally generating build instructions for performing the build action upon the build target when a dependent elements corresponding to a dependency changes;
    determining if the identified dependent compilation unit corresponds to the build rules;
    enumerating, in the build file, if the compilation unit corresponds to the build rules; the identified compilation unit as corresponding to the build action, and
    omitting, if the compilation unit does not correspond to the build rules, the identified compilation unit from triggering the build action.

15. The computing device of claim 14 further comprising a build generator operable to generate a set of build instructions, the build instructions operable to:
  selectively invoke build actions based on the dependencies such that changes to a particular compilation unit initiate successive build actions on dependent compilation units according to the dependencies, the build action further including at least one of compiling, inheriting, linking (i.e. binding labels), executing (code generators), interpreting.

16. The computing device of claim 15 wherein the build file is operable to invoke a compile time classpath defining a network of dependencies between the compilation elements, such that the deployable entities are operable to invoke a runtime classpath defining a network of dependencies between instantiated class, wherein the compile time classpaths and runtime classpaths are different.

17. The computing device of claim 14 further comprising:
  a build generator operable to identify a build target and corresponding build action, the build generator operable to identifying dependent compilation units from the dependencies and generate build instructions for conditionally performing the build action upon the build target when a dependent elements corresponding to a dependency changes, wherein the enforcer is operable to determine if the identified dependent compilation unit corresponds to the build rules, determining further comprises identifying dependencies contrary to the build rules by identifying a compile time omission, rather than runtime failure, the build generator responsive to the enforcer to:
    enumerate, in the build file, if the compilation unit corresponds to the build rules; the identified compilation unit as corresponding to the build action; and
    omit, from the build file, if the compilation unit does not correspond to the build rules, the identified compilation unit from triggering the build action.

18. The computing device of claim 17 further comprising a code base, wherein the build file is further operable to:
  traverse the build file to identify build targets and corresponding build actions;
  generate build instructions to perform build actions corresponding to build targets identified from traversing;
  identifying, if at least one of the build actions encounters a dependency contrary to the rules, the build target; and aggregate the generated build instructions to produce the code base.

19. The computing device of claim 14 wherein the functional scope includes an architectural set and an application set, the application set including an interface layer and an implementation layer, and the architectural set including a delegation layer and a middleware interaction layer, wherein the build rules are further indicative of layers adapted to depend from other layers, wherein enforcing further comprising enforcing build constraints by compiling software objects in the designated layers according to the dependencies, the build rules further indicative of:
  intercomponent, intra-component, and external dependencies;
  identifying dependency violations prior to runtime, the intra-component dependencies limiting dependency on less public layers in the same component, the intra-component dependencies limited to the interface of other components, and external dependencies limiting dependency to predefined external entities; and
  restricting a higher layer from depending on a lower layer, the higher layers defined by the public interface of the component;
  wherein the enforcer is further operable to validate the defined dependencies against the build rules, the build rules operable to identify each dependency as valid or invalid.

20. A computer program product having a computer readable storage medium operable to store computer program logic embodied in computer program code encoded as instructions thereon that, when executed by a processor, perform a method of building a software system according to a set of architectural build rules comprising:
  computer program code for identifying a plurality of software elements for inclusion in a build, the software elements collectively operable to provide a set of instructions and data for operation of the software system;
  computer program code for designating, for each of the software elements, a plurality of layers, each of the layers representing a set of compilation units operative to perform according to a predetermined functional scope;
  computer program code for enumerating a set of build rules indicative of allowable dependencies between the layers of the software elements;
  computer program code for defining a set of dependencies between the software elements, the dependencies indicative of an association between the designated layers of the software elements;
  computer program code for enforcing the build rules by analyzing the defined dependencies and identifying defined dependencies that are contrary to the enumerated build rules;
  computer program code for generating a build script, the build script operable to perform the build of each of the software elements according to the build rules and the dependencies, each of the software elements further comprising a component having a corresponding descriptor and at least one interface file, and inclusive of a set of software objects, the software objects indicative of a class and compilable as an individual executable entity, each executable entity operable as an instantiation of the class, further comprising:
  computer program code for identifying a build target and corresponding build action;
  computer program code for identifying dependent compilation units from the dependencies and conditionally generating build instructions for performing the build action upon the build target when a dependent elements corresponding to a dependency changes;
  computer program code for determining if the identified dependent compilation unit corresponds to the build rules;
  computer program code for enumerating, in the build file, if the compilation unit corresponds to the build rules; the identified compilation unit as corresponding to the build action, and
  computer program code for omitting, if the compilation unit does not correspond to the build rules, the identified compilation unit from triggering the build action.

21. A computing device having a processor, memory and instructions for performing a method of software build according to a set of architectural build rules comprising:
  processor means for identifying a plurality of software elements for inclusion in a build, the software elements collectively operable to provide a set of instructions and data for operation of the software system;
  processor means for designating, for each of the software elements, a plurality of layers, each of the layers representing a set of compilation units operative to perform according to a predetermined functional scope;
  processor means for enumerating a set of build rules indicative of allowable dependencies between the layers of the software elements;
  processor means for defining a set of dependencies between the software elements, the dependencies indicative of an association between the designated layers of the software elements; and
  processor means for enforcing the build rules by analyzing the defined dependencies and identifying defined dependencies that are contrary to the enumerated build rules;
  processor means for determining if the identified dependent compilation unit corresponds to the build rules, determining further comprises identifying dependencies contrary to the build rules by identifying a compile time omission, rather than runtime failure;
  processor means for enumerating, in a build file, if the compilation unit corresponds to the build rules; the identified compilation unit as corresponding to the build action; and
  processor means for omitting, from the build file, if the compilation unit does not correspond to the build rules, the identified compilation unit from triggering the build action; further comprising:
  means for identifying a build target and corresponding build action;
  means for identifying dependent compilation units from the dependencies and conditionally generating build instructions for performing the build action upon the build target when a dependent elements corresponding to a dependency changes;
  means for determining if the identified dependent compilation unit corresponds to the build rules;
  means for enumerating, in the build file, if the compilation unit corresponds to the build rules; the identified compilation unit as corresponding to the build action, and
  means for omitting, if the compilation unit does not correspond to the build rules, the identified compilation unit from triggering the build action.

* * * * *